(12) United States Patent
Haardt (10) Patent No.: US 6,377,559 B1
(45) Date of Patent: Apr. 23, 2002

(54) METHOD, RECEIVER AND MOBILE STATION FOR TRANSMITTING DATA IN A RADIO COMMUNICATION SYSTEM

(75) Inventor: Martin Haardt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,935

(22) Filed: May 8, 2000

Related U.S. Application Data (63) Continuation of application No. PCT/DE98/03089, filed on Oct. 21, 1998.

(30) Foreign Application Priority Data

Nov. 7, 1997 (DE) .......................................... 197 49 389

(51) Int. Cl.[7] .......................... H04L 12/26; H04Q 7/00; H04B 7/216; H04J 1/16
(52) U.S. Cl. ...................... 370/326; 370/249; 370/334; 370/342; 375/149; 375/210
(58) Field of Search .................................. 370/326, 334, 370/342, 343, 468, 477, 249, 229, 232; 375/200, 206, 260, 149, 150, 210; 455/450, 509, 452

(56) References Cited

U.S. PATENT DOCUMENTS

| | | | | |
|---|---|---|---|---|
| 5,208,804 A | * | 5/1993 | Wilson et al. | 370/343 |
| 5,544,156 A | | 8/1996 | Teder et al. | |
| 5,859,838 A | * | 1/1999 | Soliman | 370/249 |
| 5,936,950 A | * | 8/1999 | Hottinen | 370/342 |
| 5,946,345 A | * | 8/1999 | Karlsson et al. | 375/210 |
| 6,041,237 A | * | 3/2000 | Farsakh | 455/450 |
| 6,064,689 A | * | 5/2000 | Vollmer et al. | 375/149 |

FOREIGN PATENT DOCUMENTS

DE 19713667 C1 10/1998

OTHER PUBLICATIONS

Published International Application No. 97/05707 (Ritter), dated Feb. 13, 1997.

"A joint detection CDMA mobile radio system concept developed within COST 231", Peter Jung et al., IEEE, 1995, pp. 469–473.

* cited by examiner

Primary Examiner—Wellington Chin
Assistant Examiner—M Phan
(74) Attorney, Agent, or Firm—Herbert L. Lerner; Laurence A. Greenberg; Werner H. Stemer (57) ABSTRACT

A method for transmitting data between radio stations in a radio communication system includes superimposing first signaling information items with second information items at a transmitting end to form an aggregate signal. The aggregate signal is transmitted in a frequency channel, for distinguishing the first signaling information items and the second information items with the aid of individual fine structures. A received signal is evaluated at a receiving end. Initially an influence of the first signaling information items on the second information items is reduced by a compensation calculation carried out with reference to the received signal. Subsequently, the second information items are detected in the received signal already subjected to the compensation calculation. The method can be used in particular with a TD/CDMA transmission process. A receiver and a mobile station are also provided.

19 Claims, 6 Drawing Sheets

METHOD, RECEIVER AND MOBILE STATION FOR TRANSMITTING DATA IN A RADIO COMMUNICATION SYSTEM

CROSS-REFERENCE TO RELATED APPLICATION

This application is a continuation of copending International Application No. PCT/DE98/03089, filed Oct. 21, 1998, which designated the United States.

BACKGROUND OF THE INVENTION

FIELD OF THE INVENTION

The invention relates to a method, a receiver and a mobile station for transmitting data in a radio communication system, in particular in TD/CDMA mobile radio systems.

International Publication No. WO 97/05707 describes a method for transmitting data between radio stations in a radio communication system, in which first signaling information items are superimposed with second or further information items at a transmitting end to form an aggregate signal, the aggregate signal is transmitted in a frequency channel, whereby it is possible to distinguish the first signaling information items and the second information items with the aid of individual fine structures, and a received signal is evaluated at a receiving end. International Publication No. WO 97/05707 also describes a receiver for a radio station, including a radio-frequency device for demodulating received signals, wherein first signaling information items and second or further information items, which can be distinguished with the aid of individual fine structures, are superimposed in the received signals to form an aggregate signal, and a coupling device for connecting the radio-frequency device to a signal-processing device.

In radio communication systems, messages (for example voice, image information or other data) are transmitted with the aid of electromagnetic waves through an air interface between transmitting and receiving radio stations (base station or mobile station, respectively). The emission of electro-magnetic waves is performed in that case by using carrier frequencies which are situated in a frequency band provided for the respective system. In the case of the GSM (Global System for Mobile Communication), the carrier frequencies are situated in the region of 900, 1800 or 1900 MHz. Frequencies in the frequency band of approximately 2000 MHz are provided for future mobile radio networks, for example the UMTS (Universal Mobile Telecommunication System) or other systems of the third generation.

The currently existing mobile radio system GSM (Global System for Mobile Communications) is a mobile communication system having a TDMA (Time Division Multiple Access) component for subscriber separation. User information items of the subscriber connections are transmitted in time slots in accordance with a frame structure. The transmission is performed in blocks. Organization channels (BCCH broadcast control channel) which are also known from the GSM mobile radio system are likewise matched to the time frame of the frame structure, for transmitting signaling and organization information items to all mobile stations in the respective radio cell. Those organization information items include details of the location area, the radio cell, the channel structure and of options which are supported inside the cell. Further signaling information items are transmitted in the down direction.

With the aid of the organization channel, which is emitted at maximum power, a mobile station undertakes performance measurements which permit statements to be made on the radio cell suitable for a connection set-up or handover. That organization channel is transmitted in a dedicated time slot in the frequency range of the user information.

German Patent DE 197 13 667 C1 discloses a radio communication system with TDMA/CDMA subscriber separation (Code Division Multiple Access), in which the organization information items are emitted as first signaling information items, likewise together with further information items, for example with user information items, in one frequency range. On one hand, the disadvantage of that solution resides in the additional interference which the organization channel entails for the user data channels. On the other hand, the user information items or further signaling information items also disturb the transmission of the first signaling information items. The range of the organization channel is also reduced.

SUMMARY OF THE INVENTION

It is accordingly an object of the invention to provide a method, a receiver and a mobile station for transmitting data in a radio communication system, which overcome the hereinafore-mentioned disadvantages of the heretofore-known methods and devices of this general type and which improve detection of further information items.

With the foregoing and other objects in view there is provided, in accordance with the invention, a method for transmitting data between radio stations in a radio communication system, which comprises superimposing first signaling information items with second information items at a transmitting end to form an aggregate signal; transmitting the aggregate signal in a frequency channel, for distinguishing the first signaling information items and the second information items with the aid of individual fine structures; evaluating a received signal at a receiving end; initially reducing an influence of the first signaling information items on the second information items by a compensation calculation carried out with reference to the received signal; and subsequently detecting the second information items in the received signal already subjected to the compensation calculation.

With the objects of the invention in view, there is also provided a receiver for a radio station, comprising a radio-frequency device for demodulating received signals, the received signals having first signaling information items and second information items, to be distinguished with the aid of individual fine structures, superimposed therein to form an aggregate signal; a coupling device; a signal-processing device connected to the radio-frequency device by the coupling device, the signal-processing device including a device for reducing an influence of the first signaling information items on the second information items by a compensation calculation, and a detection device for the second information items; and the influence reducing device carrying out the compensation calculation before the detection device begins to detect the second information items.

With the objects of the invention in view, there is additionally provided a mobile station, comprising the receiver.

The interference affecting the further information items to be detected is reduced by the measure of compensating for the influence of the first signaling information items before detecting the further information items. The first signaling information items can be emitted without losses in quality at a higher transmission power, for example at the transmission power of the further information items, resulting in an increase in range.

It is thereby also possible for more remote radio stations, for example mobile stations in neighboring radio cells, to use the first signaling information items for performance measurement and cell selection. According to the invention, the transmission of the further information items need not be performed coherently with the first signaling information items. The transmission is admittedly performed in a common frequency band, that is to say with superimposition in terms of power, but there is no correlation between the signal components in the transmitted signal.

In accordance with another mode of the invention, the method operates particularly advantageously if the first signaling information items are emitted at the transmitting end with a lower level of directional selectivity than the further information items. In the case of a different directional selectivity, a channel estimation is carried out at the receiving end with the aid of training sequences embedded in the further information items.

The lower level of directional selectivity can be compensated by a higher process gain. The higher process gain can be implemented, for example, by the selection of a higher spread factor for the first signaling information items.

The greater spread factor for the first signaling information items is achieved according to an advantageous development by virtue of the fact that their symbols have a longer symbol duration than the symbols of the further information items. The symbol duration of the first signaling information items can be an integral multiple of the further information items. Consequently, the chips of all of the CDMA codes forming the fine structures can have one chip length (or an integral multiple thereof). As a consequence, a common clock can be used to produce the chips.

The greater process gain for the organization information items is advantageously achieved by using a significantly lower data rate than the data rate for the user information. This lower data rate is, for example, less than or equal to 1 kbit/s. The organization information items are thus limited to the most essential details, but these are transmitted in a highly interference-resistant manner. As soon as a mobile station is registered in a radio cell, the first signaling information items of the mobile station are known and can therefore be eliminated during the subsequent detection of the further information items.

In accordance with a further mode of the invention, the first signaling information items and the further information items are emitted at the transmitting end with approximately the same directional selectivity, and a channel estimation is carried out at the receiving end with the aid of the first signaling information items. Since the transmission channels are similar in this case for all information items, a single channel estimation suffices. This means a reduction in outlay in the case of the receiver. The further information items are advantageously transmitted at the transmitting end without training sequences with a lengthened data component. The data rate of the further information items can thereby be increased.

If an antenna diversity method is applied at the receiving end, it is advantageous to carry out the removal of the influence of the signaling information items for the received signals of each individual antenna element. The received signals which are thereby improved can thereupon be evaluated for the purpose of detecting the further information items with the aid of an algorithm for joint detection. The mutual influencing of the further information items is thereby also reduced.

The method according to the invention can advantageously be used for two alternative transmission methods. According to a first variant, the first signaling information items are emitted at the transmitting end in a continuous wave transmission, whereas the further information items are emitted in time slots using a TDMA transmission method. According to a second variant, the first signaling information items and the further information items are emitted at the transmitting end in time slots using a TDMA transmission method. It is thereby possible to implement the method according to the invention in a simple way in a radio communication system with the aid of the known TD/CDMA transmission method. However, it is also possible to emit all information items using continuous-wave transmission.

The influence of the first signaling information items is removed, for example, in such a way that a channel estimation is carried out for the first signaling information items, and channel coefficients are determined. A quantity is subtracted from the received signal. That quantity corresponds to the product of the channel coefficients and a known matrix of at least parts of the first signaling information items. In this case, the matrix is present in the receiving radio station. The channel coefficients are advantageously determined through the use of a Gauss-Markov estimation.

In order to further improve reception, it is advantageous to remove the influence of the first signaling information items on the basis of channel estimations at a plurality of instants. Error compensation is therefore performed for the channel estimation. A time interval over which the channel estimation is carried out can be set at the receiving end in accordance with the transmission conditions. Furthermore, it is advantageously possible to use adaptive channel estimation methods in the case of which the currently estimated channel coefficients are rated more highly than the channel coefficients previously estimated, which are likewise included in the compensation calculation.

According to an advantageous development of the invention, the frequency channel is a broadband channel, and the information items are spread with the aid of CDMA codes. The method according to the invention is therefore suitable, in particular, for broadband channels in which the information items can be transmitted with more resistance to interference.

In the case of TDMA/CDMA transmission methods, the invention is developed to the effect that, using a TDMA subscriber separation method, the further information items are transmitted in time slots with the aid of a known time pattern. This permits implementation in the existing GSM mobile radio network without the need to change the time pattern.

Error protection coding of the first signaling information items and the further information item can be carried out at the transmitting end for the purpose of further increasing the range. The error protection coding of the first signaling information item offers better protection than the error protection coding of the further information items.

This entails particular advantages if the first signaling information items have to be transmitted, for example, omnidirectionally as organization information items, with the result that no antenna gain is available for improved transmission.

Other features which are considered as characteristic for the invention are set forth in the appended claims.

Although the invention is illustrated and described herein as embodied in a method, a receiver and a mobile station for transmitting data in a radio communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
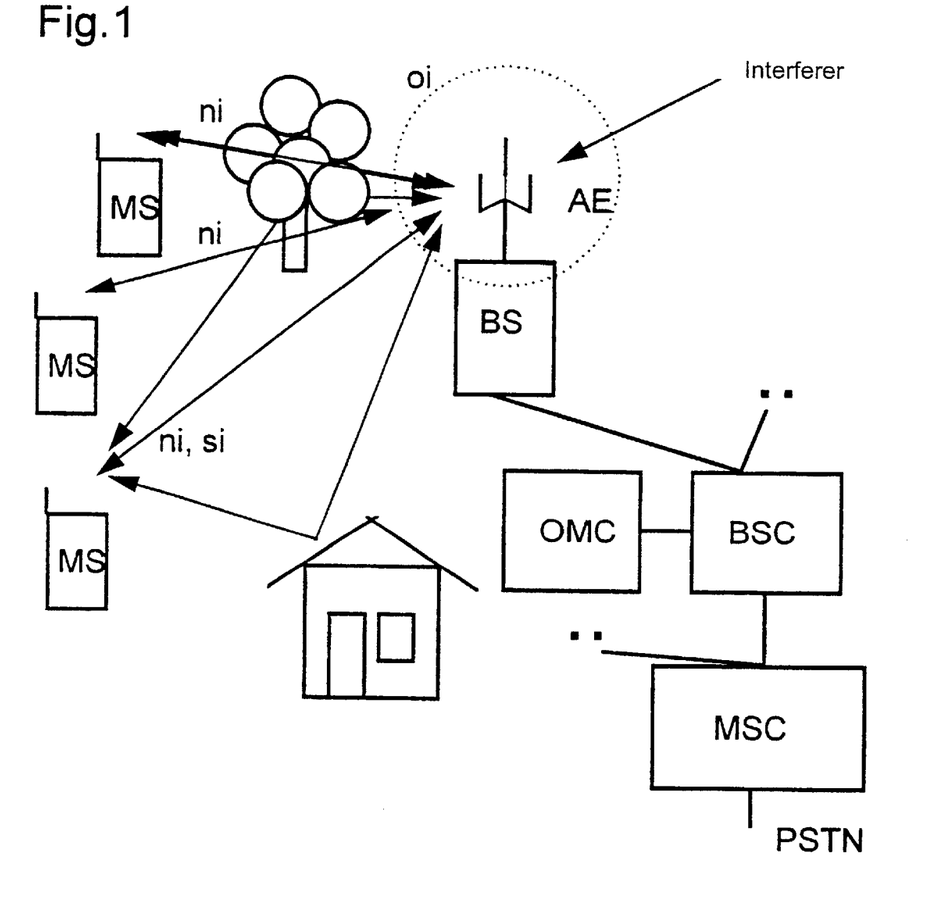
FIG. 1 is a block diagram of a mobile radio network.

Referring now to the figures of the drawings in detail and first, particularly, to FIG. 1 thereof, there is seen a structure of a mobile communication system which corresponds to a known GSM mobile radio network that includes a multiplicity of mobile switching centers MSC which are networked with one another and/or provide access to a fixed network PSTN. Furthermore, these mobile switching centers MSC in each case are connected to at least one base station controller BSC. Each base station controller BSC in turn permits a connection to at least one base station BS. Such a base station BS is a radio station which can set up a communication link to mobile stations MS through an air interface.

FIG. 1 illustrates, by way of example, three radio links for transmitting user information items ni and signaling information items si as further or second information items between three mobile stations MS and a base station BS. An operating and maintenance center OMC implements control and maintenance functions for the mobile radio network and/or for parts thereof. The functionality of this structure can be transferred to other mobile communication systems in which the invention can be used.

The base station BS is connected to an antenna device AE which, for example, includes three antenna elements. Each of the antenna elements radiates, for example, in a directional manner into a sector of radio cells supplied by the base station BS. However, it is also alternatively possible to use a larger number of antenna elements (in accordance with adaptive antennas), with the result that it is also possible to use a more extensive spatial subscriber separation with adaptive antennas. This directionally selective emission is performed for the user information items ni.

The base station BS makes organization information items oi available to the mobile stations MS as first signaling information items relating to location area (LA) and relating to the radio cell (radio cell identification). The organization information items oi are simultaneously emitted over all antenna elements of the antenna device AE. Omnidirectional emission is also performed for signaling information items si for the purpose of paging, since it is not known in which sector the targeted mobile station MS is located.

The communication links with the user information items ni between the base stations BS and the mobile stations MS are subject to multi-path propagation which is caused by reflections, for example on buildings, in addition to the direct propagation path. Directional emission by specific antenna elements of the antenna device AE yields a greater antenna gain in comparison with omnidirectional emission. The quality of the communication links is improved by the directional emission.

Assuming the mobile stations MS are moving then, together with further interference, multichannel propagation has the effect of superimposing the signal components of the various propagation paths of a subscriber signal on one another as a function of time in the case of the receiving mobile station MS. It is also assumed that the subscriber signals of different base stations BS are superimposed on one another in a frequency channel at the receiving location to form a received signal rx. The task of a receiving mobile station MS is to detect data d, transmitted in the subscriber signals, of the user information items ni, signaling information items si, and data oid of the organization information items oi.

Figure 2:
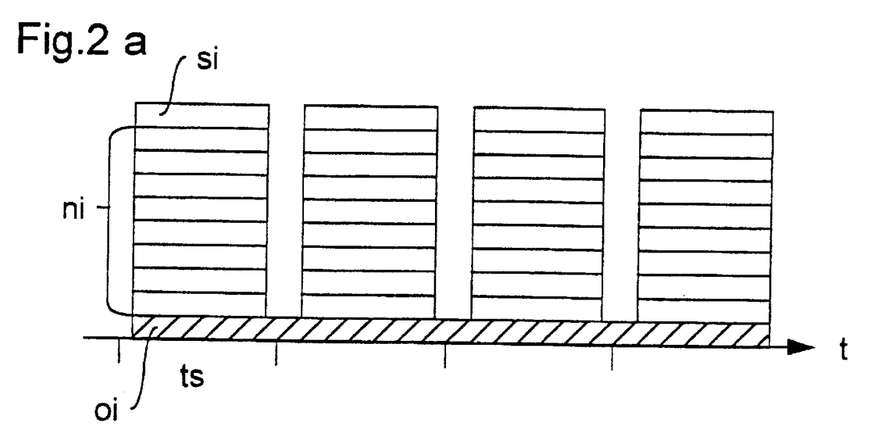
FIGS. 2a–2c are diagrams showing different transmission methods for first signaling information items and further information items.

FIGS. 2a–2c show three variants of the transmission of the information items. In FIG. 2a, user information items ni and signaling information items si are transmitted by using a TDMA method, and the organization information items oi are transmitted not in pulsed form, but as a modulated continuous wave. According to FIG. 2b, the organization information items oi are also transmitted in time slots ts, whereas according to FIG. 2c all information items ni, oi, si are transmitted by using continuous wave transmission.

Figure 3:
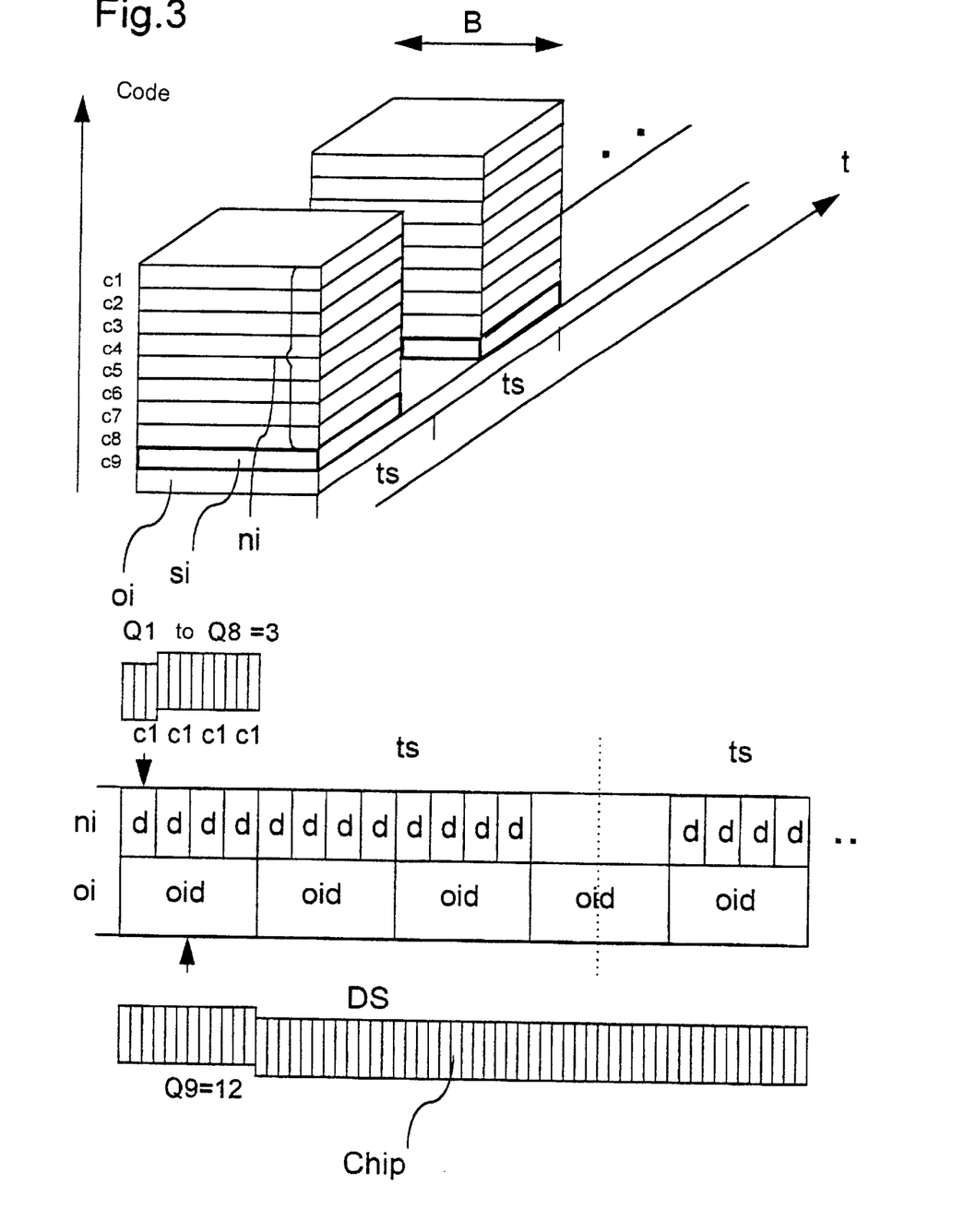
FIG. 3 is a diagram showing a frame structure of an air interface.

FIG. 3 shows a detailed layout of the variant according to FIG. 2a which is the transmission of the subscriber signals through the air interface with a bandwidth B, for example B=1.6 MHz. In this case, the air interface has a time-division multiplex (TDMA) and a code-division multiplex (CDMA) component. A plurality of non-illustrated frequency bands can be provided for the mobile radio network. A time axis t is subdivided into a time pattern including a plurality of time slots ts, for example 8 per time frame, in such a way that transmission is performed in bursts. The subscriber signals for a plurality of mobile stations MS are transmitted simultaneously in the same frequency channel. The subscriber separation per burst is performed with the aid of spread codes c1 to c8 or c9 as a spread code for a signaling channel PCH, in such a way that eight subscriber signals and a signal of a signaling channel can be transmitted simultaneously. A uniform spreading method is used for the user information items ni and signaling information items si.

The user information items ni and the signaling information items si are transmitted in blocks in the time slots ts, whereas the organization information items oi are transmitted independently of the time pattern with the aid of continuous wave (CW) transmission.

Power control is carried out for the user information items ni and is independent of the individual received powers measured and signaled in the case of the respective mobile station MS and the base station BS. In the case of the signaling information items si, power control is used with individualized signaling to individual mobile stations MS. The organization information items oi are emitted at constant power.

The spreading of the data d of the user information items ni and of the data oid of the organization information items oi is performed, in accordance with FIG. 3, for the user information items ni by spreading each data symbol d with the aid of one of the spread codes c1 to c8. A spread factor, defined by the number of chips per data symbol, is denoted by reference symbols Q1 to Q8. The spread factor Q1 of the first subscriber signal is, for example, equal to three. The spread code c1 is repeated from data symbol d to data symbol d. The spreading of the signaling information items si with the aid of a spread code c9 is performed in accordance with spreading of the user information items ni.

The spreading of the data oid of the organization information items oi is performed by using a DS-CDMA method. A symbol duration of one of these data symbols is substantially longer than that of the data d of the user information items ni. The DS spread code is a continuous spread code with a spread factor Q10=12 which is greater than that of the user information items ni. The length of the chips for spreading the user information items ni and the organization information items oi is the same, in this case.

The data rate of the organization information items oi is 200 bit/s, for example, whereas the user information items ni are transmitted at a data rate of 16 kbit/s in the case of voice transmission. The ratio of the spread factors Q1 to Q9 is therefore not specified in a manner true to scale in FIG. 3. A possible process gain for the organization information items oi is thus just 40 dB in the exemplary embodiment P=1.6 MHz/200 Hz.

The transmission of the organization information items oi is continued during pauses between transmitted bursts with data d of the user information items ni.

Figure 4:
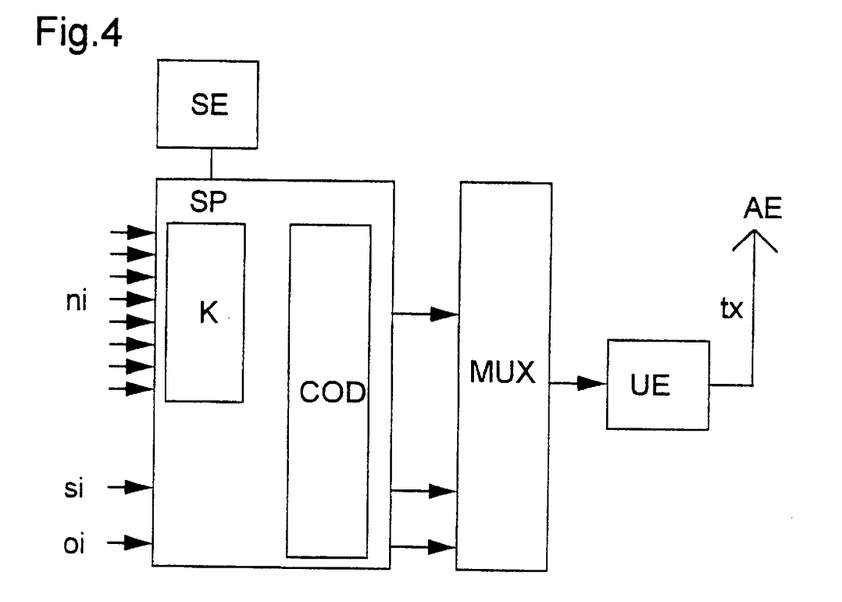
FIG. 4 is a block diagram of a transmitter of a base station.

FIG. 4 shows a structure of a transmitter, for example in the base station BS. The transmitter includes a signal-processing device SP, for example a digital signal processor, which is controlled by a control device SE. Furthermore, the transmitter includes a coder COD which carries out functions, to be discussed below, of convolution coding and block coding, as well as of scrambling. A combination device MUX combines signals of the user information items ni, the signaling information items si and the organization information items oi to form a transmitted signal tx. The transmit power of the organization information items oi corresponds approximately to the transmit power of the further or second information items si, ni. A transmitting device UE prepares the transmit signal tx for emission. The transmit signal tx is transmitted through the antenna device AE.

The subscriber signals of eight connections of a time slot in a multiplexer K are assigned to a time slot ts in the signal-processing device SP. Signals which are superimposed in a frequency channel in the combination device MUX to form a common broadband signal are produced by the spreading of the information items ni, si, oi in the signal-processing device SP with the aid of the assigned spread code.

Figure 5:
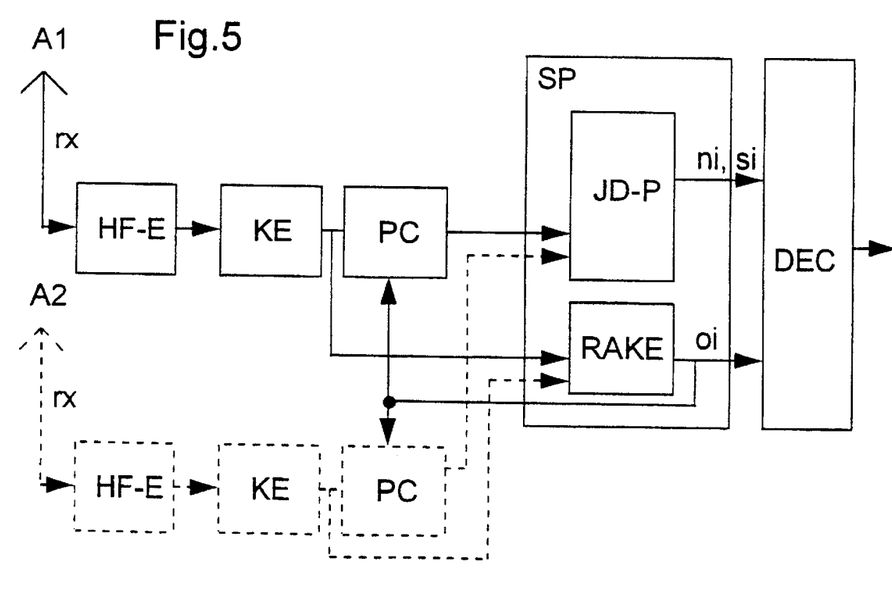
FIG. 5 is a block diagram of a receiver of a mobile station.

A receiver is shown in FIG. 5. Received signals rx which are received by an antenna device Al are amplified in a radio-frequency device HF-E, which corresponds to the transmitting device UE of the transmitter, converted to the baseband and demodulated. A device PC is provided for removing the influence of the organization information items oi on the user and signaling information items ni, si. A coupling device KE connects the radio-frequency device HF-E through the device PC to a signal-processing device SP.

Another reception path with an antenna device A2 and elements HF-E, KE and PC is shown in broken lines. The device PC for removing the influence of the organization information items oi is applied per antenna element A1, A2. In other words, in the case of antenna diversity reception, this improvement of the received signal rx is carried out in both reception paths. Only one device PC is provided if only one antenna element A1 is used as the antenna device AE. In this case the device PC for removing the influence of the organization information items oi is implemented inside the signal-processing device SP.

Channel estimation is carried out in the device PC with reference to the organization information items oi on the basis of chip sequences known in the receiver. In the process, channel coefficients h $$h=[h_1, h_2 \ldots h_W]^T$$

which specify a channel pulse response having a length W are determined.

It is only B samples which are influenced only by the burst to be evaluated that are considered below. Consequently, there is no need to take account of interference from previous or following bursts.

The received signal rx corresponds to samples e which have a vector $$e=[e_1, e_2 \ldots e_B]^T = e_{pi} + e'$$

The vectors $e_{pi}$ and e' are the components of the organization information items oi (pilot channel) and the further or second information items ni, si as well as the additive noise (in e').

A chip sequence which is transmitted within the organization information items oi is known in the receiver. This chip sequence having a length B+W−1 is denoted as $s_i$, $1 \leq i \leq B+W-1$, and so it is possible to assume a matrix $P_s$ with complex values of at least parts of the samples $e_{pi}$ of the organization information items oi:

$$e_{pi} = \begin{bmatrix} S_W & S_{W-1} & S_{W-2} & \cdots & S_1 \\ S_{W+1} & S_W & S_{W-1} & \cdots & S_2 \\ \ldots & \ldots & \ldots & \ldots & \ldots \\ S_{W+B-1} & S_{W+B-2} & S_{W+B-3} & \cdots & S_B \end{bmatrix} \cdot h = P_s \cdot h.$$

A channel estimation with high accuracy carried out by using a Gauss-Markov estimation therefore yields as estimated values:

$$\hat{h} = (P_s^H R_{e'e'}^{-1} P_s)^{-1} P_s^H R_{e'e'}^{-1} \cdot e,$$

where $$R_{e'e'} = E\{e'e'^H\}.$$

Alternatively, it is also possible to use a signal-matched filter, which can be implemented more favorably in terms of outlay in conjunction with a somewhat lower efficiency.

If the noise component e' is neglected, $R_{e'e'}$ can be determined from the known spectral properties of a pulse-shaping filter at the transmitting end.

Assuming that $R_{e'e'} = \sigma^2 I$, and given autocorrelation properties of the chip sequence in such a way that $P_s^H P_s$ corresponds to the scaled unit matrix, the channel estimation reduces to a signal-matched filter:

$$\hat{h} = P_s^H \cdot e.$$

The removal of the influence of the organization information items can thereupon be performed in accordance with the following compensation calculation:

$$\hat{e}' = e - P_s \cdot \hat{h},$$

with the result that the modified vector ê' is subsequently used in the data detection.

If the estimated channel coefficients h only vary slightly from burst to burst, the received signals of a plurality of bursts can be taken into account for the channel estimation.

In the case of two bursts being considered, samples are yielded in accordance with:

$$e^{(2)} = [e_1, e_2 \ldots e_{2B+W-1}]^T = e^{(2)}_{pi} + e^{(2)'}.$$

It is possible for the influence of the organization information items oi to be expressed as follows:

$$e^{(2)}_{pi} = \begin{bmatrix} P_s \\ P_0 \\ P_s \end{bmatrix} \cdot h = P \cdot h,$$

where $P_s$ accords with the above definition, and $$P_0 = \begin{bmatrix} S_1 & S_{W+B-1} & S_{W+B-2} & \cdots & S_{B+1} \\ S_2 & S_1 & S_{W+B-1} & \cdots & S_{B+2} \\ \cdots & \cdots & \cdots & \cdots & \cdots \\ S_{W-1} & S_{W-2} & S_{W-3} & \cdots & S_{W+B-1} \end{bmatrix} \in C^{(W-1) \times W}.$$

The expressions ê',e,$P_s$ are therefore replaced by $\hat{e}^{(2)'}$, $e^{(2)}$, P in the Gauss-Markov estimation.

However, in the case of stronger fluctuations, use should be made of an adaptive channel estimation which can be based on an LMS or RLS method. In the case of strongly time-variant channels, adaptive channel estimation is substantially more reliable than estimation based on midamble evaluation. It can also be provided for the further or second information items ni, si to be transmitted without training sequences (midamble) in the middle of two data components, but the data rate increased, in return, by inserting further user data.

As a digital signal processor, the signal-processing device SP further includes a JD processor JD-P for detecting the user information items ni and the signaling information items si using the JD-CDMA method, and a rake receiver RAKE for detecting the organization information items oi.

If no continuous-wave transmission of the organization information items oi takes place, the organization information items oi are also detected in the JD processor JD-P. If organization or signaling information items oi, si are transmitted in dedicated time slots ts, only detection is carried out for these time slots.

The detection is performed in parallel, in which case in order to detect the organization information items oi, the signal-processing processing device SP correlates the received data d with the spread codes known in the receiver so that the bandwidth of the received signals is reduced and the spacing from the signal to the noise level is increased. Detection is thereby possible even in the case of interference by interferers or between the symbols. The detected organization information items oi are fed back for the further compensation calculation to the device PC from the RAKE receiver. The coding at the transmitting end is cancelled in a decoder DEC.

In mobile stations MS, the RAKE receiver RAKE of the JD processor JD-P measures the received power for the organization information items oi in an organization channel BCCH, and uses it as a reference for decisions on changing into other cells, and for power control. A subscriber paging channel PCH is used in the down direction for subscriber paging information items, and in this case the mobile stations MS carry out a comparison with the details on the paged mobile station MS. If the details correspond to values referred to the mobile station, user access can be performed in a subscriber access channel RACH in the up direction. Intensified error protection is carried out for those three channels BCCH, PCH and RACH, since in their case transmitting or receiving cannot be carried out in a directionally selective manner. The intensified error protection goes beyond error protection that is possibly provided for other purposes.

Figure 6:
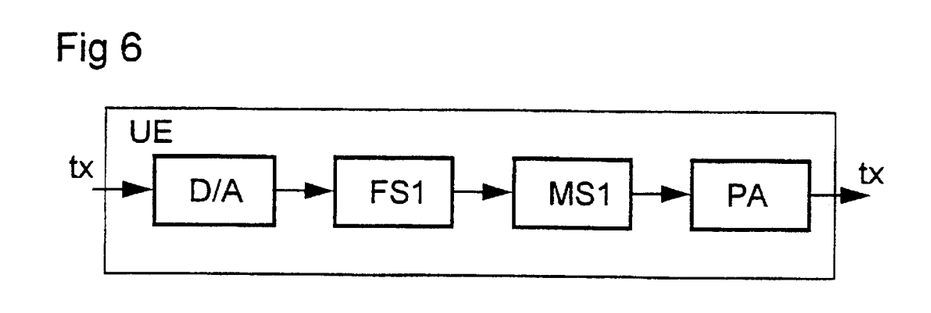
FIG. 6 is a block diagram of a transmitting device.
Figure 7:
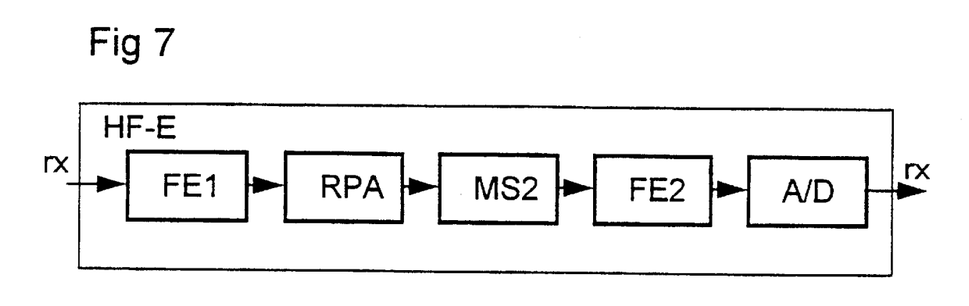
FIG. 7 is a block diagram of a radio-frequency device.

Components of the radio stations MS, BS for conditioning the radio-frequency transmitted and received signals tx, rx are shown in FIGS. 6 and 7.

The transmitting device UE according to FIG. 6 includes a digital/analog converter D/A for real and imaginary parts, first analog transmitting filters FS1 for low-pass filtering of the signals in the baseband, a first mixing stage MS1 for converting the transmitted signals tx into the transmitting frequency band, and a power amplifier PA for amplifying the transmitted signals tx.

The radio-frequency device HF-E according to FIG. 7 includes a first analog receiving filter FE1, a reception amplifier RPA for measuring and amplifying the received signals rx, a second mixing stage MS2 for converting the received signals rx into the baseband (it is also possible to use a plurality of mixing stages), second analog receiving filters FE2, and finally an analog/digital converter A/D for real and imaginary parts, which produces digital received signals rx.

The radio-frequency device HF-E and the transmitting device UE are constructed as broadband devices, for example for a frequency band of at least B=1.6 MHz.

Figure 8:
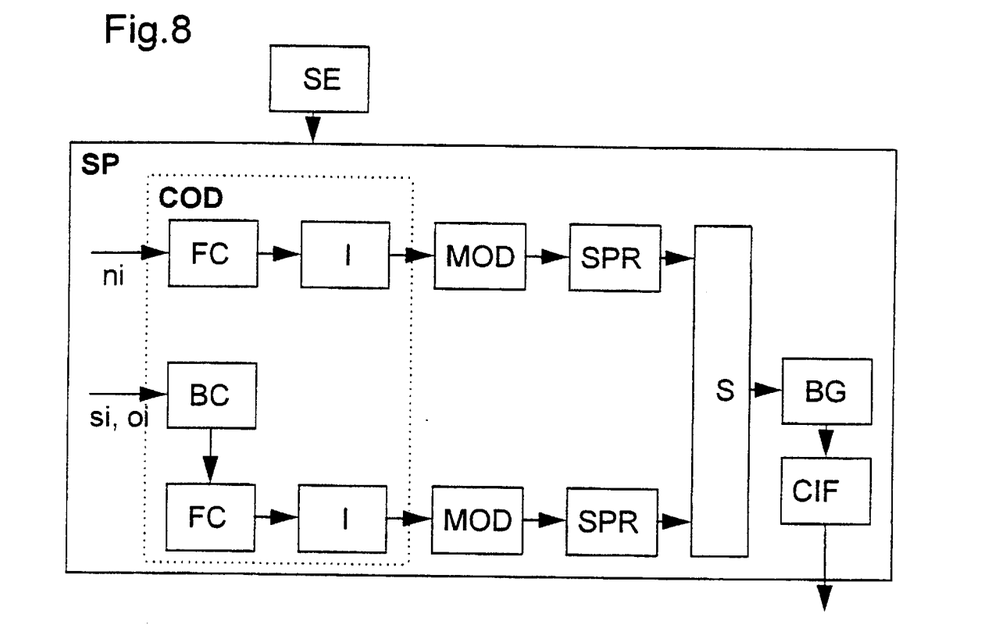
FIG. 8 is a block diagram of a signal-processing unit at a transmitting end.

A transmitter according to FIG. 8 receives the previously digitized data symbols of a data source. Block coding takes place for the signaling information items si, oi, and this is followed by channel coding in a convolution coder FC for all information items ni, si, oi, for example at a rate of 1/2 and with a constraint length of 5 for the user information items ni. This is followed by scrambling in an interleaver I with a scrambling depth of 4 or 16.

The scrambled data are subsequently 4-PSK-modulated in a modulator MOD, converted into 4-PSK symbols and thereupon spread in a spreading device SPR in accordance with individual spread codes. This processing is carried out in the signal-processing device SP in parallel for the user information items ni and signaling information items si, oi.

The spread data of the data channels for the user information items ni and the signaling information items si are superimposed in an adding element S. The user information items are weighted in this superimposition in accordance with the desired setting of the transmitting power. The superimposed signal is fed to a burst generator BG which assembles the burst, while taking account of the connection-specific midambles, if appropriate.

Since use is made of complex CDMA codes, which are derived from binary CDMA codes by multiplying by $j^{q-1}$, the output signal of a chip pulse filter CIF, which follows the burst generator BG, is GMSK-modulated, and has an approximately constant envelope if the connection uses only one data channel. The chip pulse filter CIF carries out a convolution with the aid of a GMSK main pulse.

Figure 9:
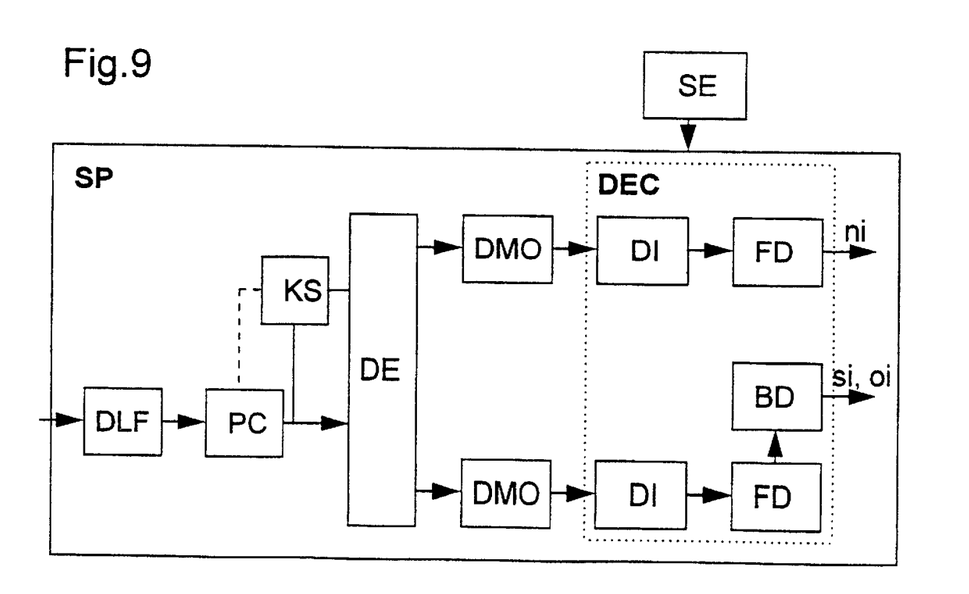
FIG. 9 is a block diagram of a signal-processing unit at a receiving end.

According to FIG. 9, after analog processing in the radio-frequency device HF-E, digital low-pass filtering of the received signals takes place in a digital low-pass filter DLF at the receiving end. Thereupon, the previously described elimination of the influence of the organization information items oi on the received signal is carried out. A part of the received signal which is improved thereby is transmitted to a channel estimator KS. A data estimation in a joint detection data estimator DE is carried out in common for all connections with the user information items ni and the signaling information items si, oi. The organization information item oi is evaluated separately in the case of the rake receiver RAKE. After the separation of the information items ni, si, oi, demodulation takes place in a demodulator DMO, descrambling takes place in a deinterleaver DI, and channel decoding takes place in convolution decoders FD. In addition, block decoding is carried out in a block decoder BD for the signaling information items si, oi.

The digital signal processing is controlled by a control device SE at the transmitting end and receiving end. The control device SE takes account, in particular, of the number of data channels per connection, the spread codes of the data channels, the current burst structure, the requirements placed on channel estimation, and the individual settings for the error protection coding and decoding for the various information items ni, si, oi.

I claim:

1. A method for transmitting data between radio stations in a radio communication system, which comprises:

superimposing first signaling information items with second information items at a transmitting end to form an aggregate signal;

transmitting the aggregate signal in a frequency channel, for distinguishing the first signaling information items and the second information items with the aid of individual fine structures;

evaluating a received signal at a receiving end;

initially reducing an influence of the first signaling information items on the second information items by a compensation calculation carried out with reference to the received signal; and subsequently detecting the second information items in the received signal already subjected to the compensation calculation.

2. The method according to claim 1, which further comprises emitting the first signaling information items and the second information items at the transmitting end with approximately the same directional selectivity, and carrying out a channel estimation at the receiving end with the aid of the first signaling information items.

3. The method according to claim 2, which further comprises transmitting the second information items at the transmitting end without training sequences with a lengthened data component.

4. The method according to claim 1, which further comprises emitting the first signaling information items at the transmitting end with a lower level of directional selectivity than the second information items, and carrying out the channel estimation at the receiving end with the aid of training sequences embedded in the second information items.

5. The method according to claim 1, which further comprises the influence of the signaling information items is removed at the receiving end for the received signals of each individual antenna element.

6. The method according to claim 1, which further comprises detecting the second information items at the receiving end with the aid of an algorithm for joint detection.

7. The method according to claim 1, which further comprises emitting the first signaling information items at the transmitting end in a continuous wave transmission, and emitting the second information items in time slots using a TDMA transmission method.

8. The method according to claim 1, which further comprises emitting the first signaling information items and the second information items at the transmitting end in time slots using a TDMA transmission method.

9. The method according to claim 1, which further comprises removing the influence of the first signaling information items at the transmitting end to carry out a channel estimation for the first signaling information items, determining channel coefficients, and subtracting a quantity from the received signal corresponding to a product of the channel coefficients and a known matrix of at least parts of the first signaling information items.

10. The method according to claim 9, which further comprises determining the channel coefficients by a Gauss-Markov estimation or a signal-matched filter.

11. The method according to claim 9, which further comprises removing the influence of the first signaling information items on a basis of channel estimations at a plurality of instants.

12. The method according to claim 1, which further comprises configuring the frequency channel as a broadband channel, and spreading the information items with the aid of CDMA codes.

13. The method according to claim 1, which further comprises transmitting the first signaling information items in a spread manner using a DS-CDMA method.

14. The method according to claim 1, which further comprises carrying out error protection coding of the first signaling information items and the second information items at the transmitting end, and offering better protection with the error protection coding of the first signaling information items than the error protection coding of the second information items.

15. The method according to claim 1, which further comprises transmitting the first signaling information items omnidirectionally.

16. A receiver for a radio station, comprising:

a radio-frequency device for demodulating received signals, the received signals having first signaling information items and second information items, to be distinguished with the aid of individual fine structures, superimposed therein to form an aggregate signal;

a coupling device;

a signal-processing device connected to said radio-frequency device by said coupling device, said signal-processing device including a device for reducing an influence of the first signaling information items on the second information items by a compensation calculation, and a detection device for the second information items; and said influence reducing device carrying out the compensation calculation before said detection device begins to detect the second information items.

17. The receiver according to claim 16, wherein said detection device includes a JD-CDMA processor for the second information items.

18. The receiver according to claim 16, including an analog/digital converter, connected to said radio-frequency device and said signal-processing device, for converting the received signals into symbols with a discrete set of values for further processing in said signal-processing device.

19. A mobile station, comprising a receiver according to claim 16.

* * * * *